(12) United States Patent
Bermel et al.

(10) Patent No.: US 7,085,444 B2
(45) Date of Patent: Aug. 1, 2006

(54) POROUS OPTICAL SWITCH FILMS

(75) Inventors: Marcus S. Bermel, Pittsford, NY (US);
Robert F. Cournoyer, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 87 days.

(21) Appl. No.: 10/668,421

(22) Filed: Sep. 23, 2003

(65) Prior Publication Data

US 2004/0165814 A1 Aug. 26, 2004

Related U.S. Application Data

(60) Provisional application No. 60/450,447, filed on Feb. 25, 2003.

(51) Int. Cl.
*G02B 6/26* (2006.01)
*G02B 6/42* (2006.01)
*G09G 3/00* (2006.01)

(52) U.S. Cl. ............... 385/16; 385/901; 349/64; 349/112; 345/30; 345/31; 345/32; 345/45

(58) Field of Classification Search ............ None
See application file for complete search history.

(56) References Cited

U.S. PATENT DOCUMENTS

| | | | |
|---|---|---|---|
| 2,761,791 A | 9/1956 | Russell | |
| 3,508,947 A | 4/1970 | Hughes | |
| 4,113,360 A | 9/1978 | Baur et al. | |
| 4,133,798 A * | 1/1979 | Nishimura et al. | 524/485 |
| 4,419,663 A | 12/1983 | Kohasi | 340/783 |
| 4,584,231 A | 4/1986 | Knoop | |
| 4,664,859 A | 5/1987 | Knoop | |
| 5,140,398 A * | 8/1992 | Matsuda et al. | 257/53 |
| 5,141,461 A * | 8/1992 | Nishimura et al. | 445/52 |
| 5,238,636 A * | 8/1993 | Furukawa et al. | 264/41 |
| 5,256,357 A | 10/1993 | Hayward | |
| 5,469,278 A | 11/1995 | Takahara et al. | 359/51 |
| 5,771,321 A * | 6/1998 | Stern | 385/31 |
| 5,808,781 A * | 9/1998 | Arney et al. | 359/291 |
| 6,055,344 A * | 4/2000 | Fouquet et al. | 385/16 |
| 6,222,003 B1 | 4/2001 | Hosoi et al. | |
| 6,628,246 B1 * | 9/2003 | Van Gorkom | 345/30 |
| 6,654,085 B1 * | 11/2003 | Koike et al. | 349/112 |
| 6,787,601 B1 * | 9/2004 | Lamola et al. | 524/714 |

(Continued)

FOREIGN PATENT DOCUMENTS

WO 99/28890 6/1999

OTHER PUBLICATIONS

"Resistivity Measurements on Buried Conductive Layers" by Robert A. Elder. EOS/ESD Symposium Proceedings, Sep. 1990. pp. 251-254.

(Continued)

*Primary Examiner*—Frank G. Font
*Assistant Examiner*—Erin Chiem
(74) *Attorney, Agent, or Firm*—Stephen H. Shaw

(57) ABSTRACT

A porous optical switching film is situated between at least two plates that have an electrical bias between them.

12 Claims, 11 Drawing Sheets

U.S. PATENT DOCUMENTS

| | | | |
|---|---|---|---|
| 6,808,654 B1 * | 10/2004 | Hayashi et al. | 252/512 |
| 6,879,307 B1 * | 4/2005 | Stern | 345/84 |
| 2002/0154261 A1 * | 10/2002 | Kralik | 349/117 |
| 2003/0114568 A1 * | 6/2003 | Sato | 524/431 |
| 2003/0175004 A1 * | 9/2003 | Garito et al. | 385/143 |
| 2003/0180029 A1 * | 9/2003 | Garito et al. | 385/142 |
| 2005/0099669 A1 * | 5/2005 | Kowarz et al. | 359/291 |

OTHER PUBLICATIONS

Yves-M. Tricot, "Surfactants: Static and Dynamic Surface Tension" from Liquid Film Coating, Scientific Principles and Their Technological Implications, Edited by Stephan F. Kistler and Peter M. Schweizer, pp. 99-136.

* cited by examiner

POROUS OPTICAL SWITCH FILMS

CROSS-REFERENCE TO RELATED APPLICATIONS

The present application is related to U.S. application Ser. No. 60/450,447, filed Feb. 25, 2003, by Marcus S. Bermel et al., and titled, "OPTICAL SWITCH MICROFILMS."

FIELD OF THE INVENTION

This invention relates generally to an electromechanical switch and a film used in an electromechanical switch, and more particularly, to an improved optical switch device, optical film, and a method for the manufacture of the optical film.

BACKGROUND OF THE INVENTION

In U.S. Pat. No. 4,113,360 issued Sep. 12, 1978 to Bauer et al., titled "INDICATING DEVICE FOR ILLUSTRATING SYMBOLS OF ALL KINDS," a display device is disclosed comprising a first plate acting as a light guide or fluorescent material, a second plate positioned some distance apart from the first plate, and a thin movable film situated between the two plates. The movable film is flexible and can be made to locally contact the first plate and allow light to be transmitted from the first plate into the film. If the film is constructed to scatter the light, then the movable film acts as an optical switch to create bright and dark regions on the plates as the film contacts or separates from the first plate, respectively. Rapid contact and separation of the film from the first plate can be used to create gray regions.

Bauer et al. teach controlling the film's movement by electrical means. For example, the film may contain a very thin layer of indium tin oxide that permits an electrical charge to be applied to the film. Similar conductive layers may be placed on the plates. An electrical bias between the plates and the film may be used to move the film toward or away from the light guide. Alternatively, U.S. Pat. No. 5,771,321 issued Jun. 23, 1998 to Stern, titled "MICROMECHANICAL OPTICAL SWITCH AND FLAT PANEL DISPLAY," describes an electromechanical means of controlling the film's movement.

Typically, the plates are rigid with a thickness on the order of millimeters and are comprised of clear materials such as glass or hardened plastic. The film, on the other hand, must be flexible and it has thickness on the order of a micron. The film may be comprised of resin material such as polycarbonate or polystyrene as suggested by Stern in U.S. Pat. No. 5,771,321, referenced above.

One drawback to the operation of an information display panel using the optical switching device described above, is that the movement of the optical film may be impeded by an air pressure differential in the spaces existing between the film and the plates. To overcome the air pressure differential, undesirably high voltages are required to move the film. In World Intellectual Property Organization Application Publication No. WO 99/28890, by Gerardus Van Gorkom, published on Jun. 10, 1999, and titled "DISPLAY DEVICE COMPRISING A LIGHT GUIDE," a means of minimizing pressure differential is proposed whereby the film is situated in an evacuated space. Van Gorkom discloses applying a vacuum of preferably less than 10 Torr to the chambers inside the switching device. However, a highly evacuated system is difficult to fabricate and is vulnerable to air leakage during the lifetime of the switching device operating at ambient conditions. Moreover, an evacuated system precludes the use of plastic plates in the switching device since plastic materials are permeable to ambient gases such as nitrogen, oxygen, and water. Because rigid glass plates would be required to maintain a vacuum inside the switching device, a flexible plastic display panel is not possible using Van Gorkom's teachings. Therefore, it remains highly desirable to have an optical switching device that does not require an evacuated system.

Another drawback to the preparation of the optical switch film described above is the need to apply a conductive layer to the optical switch film in a separate operation. Typically, the conductive material is a thin, transparent coating of indium tin oxide that is separately applied at high temperatures of 80–200 degrees Celsius. At these high temperatures, many polymeric films are vulnerable to thermal degradation and/or mechanical distortion. Therefore, it is desirable to have a method of manufacturing an optical switch film with an electrically conductive layer that does not require a separate manufacturing operation and that does not require a high temperature application process.

The flexible optical switch film described above is generally desired to have good light scattering ability, transparency, high uniformity, and low birefringence. Moreover, optical switch films are generally very thin (i.e. on the order of a micron in thickness), but their thickness may vary depending on the final application.

In general, optical films made from polymer resins are prepared either by melt extrusion methods or by casting methods. Melt extrusion methods involve heating the resin until it is molten (i.e., approximate viscosity on the order of 100,000 cp); applying the hot molten resin to a highly polished metal band or drum with an extrusion die; cooling the film; and finally peeling the film from the metal support. For many reasons, however, films prepared by melt extrusion are generally not suitable for some optical applications. Principal among these is the fact that melt extruded films exhibit a high degree of optical birefringence. In the case of many polymers there is the additional problem of melting the polymer. For example, highly saponified polyvinyl alcohol has a very high melting temperature of 230 degrees Celsius, and this is above the temperature where discoloration or decomposition begins (~200 degrees Celsius). Similarly, cellulose triacetate polymer has a very high melting temperature of 270–300 degrees Celsius, and this is above the temperature where decomposition begins. In addition, melt extruded films are known to suffer from other artifacts such as poor flatness, pinholes, and inclusions. Such imperfections may compromise the optical and mechanical properties of optical films. For these reasons, melt extrusion methods are generally not suitable for fabricating many polymer resin films intended for optical applications. Rather, casting methods are generally used to produce these films.

As stated above, polymer resin films, for optical applications, are manufactured almost exclusively by casting methods. Casting methods involve initially dissolving the polymer in an appropriate solvent to form a dope having a high viscosity on the order of 50,000 cp; applying the viscous dope to a continuous highly polished metal band or drum through an extrusion die; partially drying the wet film; peeling the partially dried film from the metal support; and finally, conveying the partially dried film through an oven to more completely remove solvent from the film. Cast films typically have a final dry thickness in the range of 40–200 μm.

In general, thin films of less than 40 μm are very difficult to produce by casting methods due to the fragility of the wet film during the peeling and drying processes. Films having a thickness of greater than 200 μm are also problematic to manufacture due to difficulties associated with the removal of solvent in the final drying step. Although the dissolution and drying steps of the casting method add complexity and expense, cast films generally have better optical properties when compared to films prepared by melt extrusion methods, and problems associated with high temperature processing are avoided.

One obvious drawback to using casting methods to prepare optical switch films is that very thin films of less than 40 microns are very difficult to manufacture in practical operations. Another drawback to the casting method is the inability to accurately apply multiple layers. As noted in U.S. Pat. No. 5,256,357 issued Oct. 26, 1993 to Hayward, titled "APPARATUS AND METHOD FOR COCASTING FILM LAYERS," conventional multi-slot casting dies create unacceptably non-uniform films. In particular, line and streak nonuniformity is greater than 5% with prior art devices. Acceptable two layer films may be prepared by employing special die lip designs as taught by Hayward in U.S. Pat. No. 5,256,357, but the die designs are complex and may be impractical for simultaneously applying more than two layers.

The manufacture of polymer resin films by the casting method is also confounded by a number of artifacts associated with the peeling and conveyance operations. Peeling operations, for example, frequently require using converting aids such as special co-solvents or additives in the casting formulation to facilitate peeling the film from the metal substrate without creating streak artifacts. In fact, peeling can be so problematic that some films such as polymethylmethacrylate films can not be manufactured by casting methods without resorting to specialty co-polymers as noted in U.S. Pat. No. 4,584,231 issued Apr. 22, 1986, titled "SOLVENT CAST ACRYLIC FILM," and U.S. Pat. No. 4,664,859 issued May 12, 1987, titled "PROCESS FOR SOLVENT CASTING A FILM," both issued to Knoop. In addition to the aforementioned peeling artifacts, cast films may be damaged during conveyance operations while traveling across numerous rollers prior to the final drying operation. For example, abrasion, scratch and wrinkle artifacts of polycarbonate films have been noted in U.S. Pat. No. 6,222,003 issued Apr. 24, 2001 to Hosoi et al., and titled "OPTICAL FILM AND METHOD FOR PRODUCING SAME." To minimize damage during conveyance, cast polycarbonate films require additional attention be spent on the film, including using special additives that act as lubricants or surface modifiers, or using a protective laminate sheet, or using knurled film edges. However, special additives may compromise film clarity. Moreover, lamination and edge knurling devices are expensive and add complexity to the casting process.

Finally, cast films may exhibit undesirable cockle or wrinkles. Thinner films are especially vulnerable to dimensional artifacts, either during the peeling and drying steps of the casting process, or during subsequent handling of the film. Very thin films on the order of one micron in thickness are especially difficult to handle without wrinkling. Moreover, many cast films may naturally become distorted over time due to the effects of moisture. For optical films, good dimensional stability is necessary during storage as well as during subsequent fabrication of the switching device.

Consequently, a need exists to overcome the limitation of requiring an evacuated system in optical switch devices. A specific need exists to minimize the pressure differential across the film during movement of the film. Yet another need exists to overcome the inherent necessity of a separate high temperature process when applying an electrically conductive layer to an optical switch film.

SUMMARY OF THE INVENTION

The above needs are met according to the present invention by providing an optical switching film between at least two plates and having an electrical bias between the at least two plates, wherein the optical switching film includes a porous film. Another embodiment provides an optical device, that includes a porous film; and at least two plates having the porous film between the at least two plates such that an optical switch is provided for the optical device.

An alternative embodiment for an optical device provides an optical device, that includes a multi-layered composite film formed simultaneously and coated on a carrier substrate, wherein the multi-layered composite film includes at least one electrically conductive layer; and at least two plates having the multi-layered composite film between the at least two plates such that an optical switch is provided for the optical device.

Several alternative processing embodiments are provided. First, a method for simultaneously applying an electrically conductive layer during manufacturing of porous films, including the steps of providing a carrier substrate; coating a releasable porous film onto the carrier substrate; and coating the electrically conductive layer onto the releasable porous film at the same time as the releasable porous film is coated onto the carrier substrate. Second, a method for simultaneously applying an electrically conductive layer during manufacturing of films, that includes the steps of: providing a carrier substrate; coating a releasable film onto the carrier substrate; and coating the electrically conductive layer onto the releasable film at the same time as the releasable film is coated onto the carrier substrate. Third, a method for simultaneously applying an electrically conductive layer during manufacturing of optical-switch film, including the steps of: providing a carrier substrate; coating a releasable optical-switch film onto the carrier substrate; and coating the electrically conductive layer onto the releasable optical-switch film at the same time as the releasable optical-switch film is coated onto the carrier substrate.

DETAILED DESCRIPTION OF THE INVENTION

Figure 1:
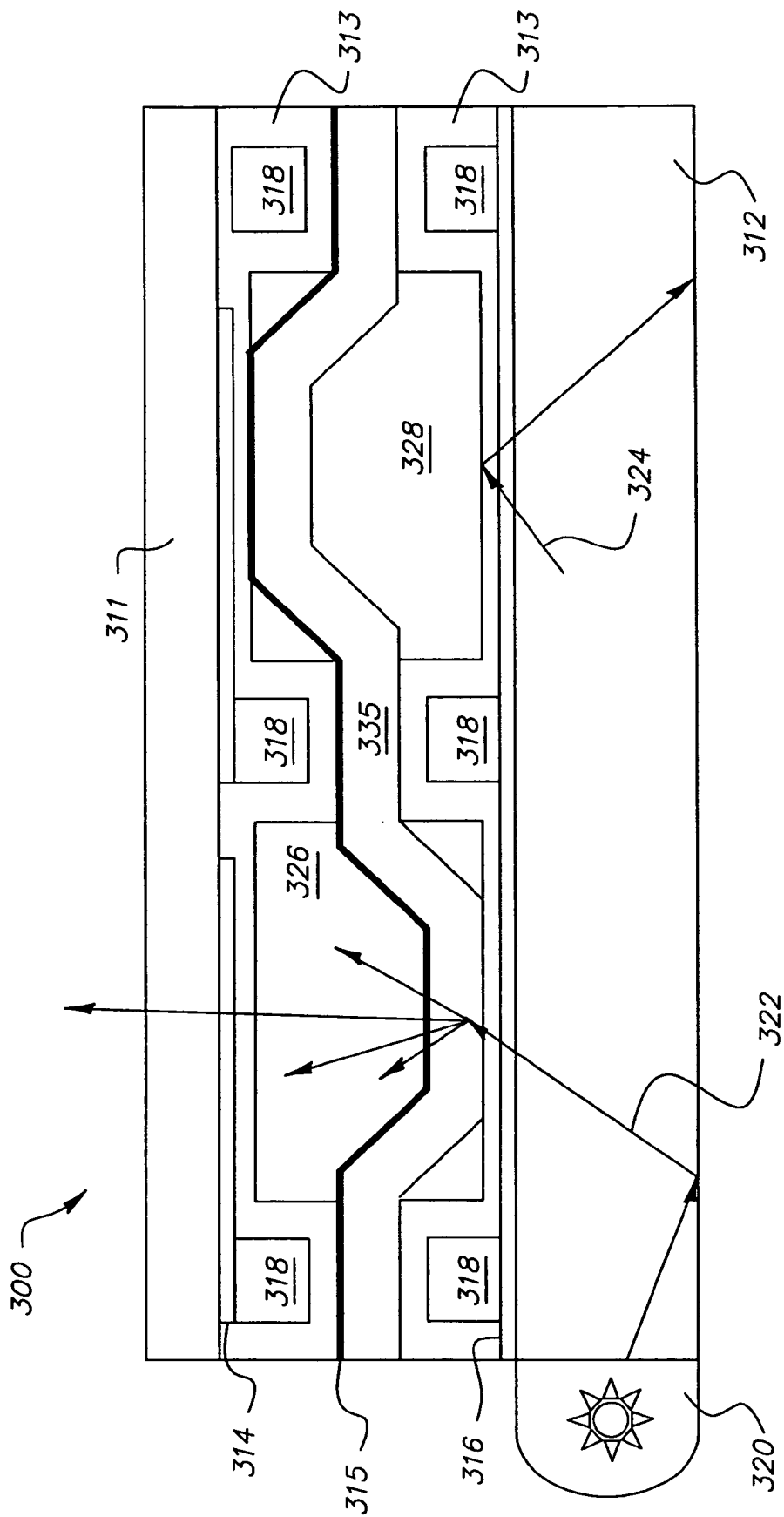
FIG. 1 is a schematic of an optical switch device with a solid optical switch film as taught in prior art.

Briefly stated, the foregoing and numerous other features, objects and advantages of the present invention will become readily apparent upon review of the detailed description, claims and drawings set forth herein. These features, objects and advantages are accomplished by replacing the solid film, used as the moveable switch element in prior art switching devices, with the porous optical film of the present invention. This novel porous optical switch film allows fluid (e.g. air) to flow freely, among compartments in the switching device, during movement of the film. As a result, the pressure differential across the optical switch film is minimized. Additionally, operation of the optical switch device using low switching potentials, all the while with fluid pressure inside the switching device at ambient pressure, is possible. Thus, the switching device may be operated at internal pressures well above 10 Torr. Furthermore, the porous film of the present invention also permits the use of plate materials, such as thin flexible plastic materials, that are permeable to ambient gases such as nitrogen, oxygen, and water since evacuation of the internal compartments in the switching device is not required. As a result, thin flexible display devices can be manufactured using the porous optical switch film of the present invention.

In addition, the present invention teaches new methods for preparing porous optical switch films. Specifically, porous films may be manufactured by applying a low viscosity fluid containing polymeric resins onto a moving carrier substrate by a thin film coating method. The porosity of the optical switch film is controlled by deliberately creating microvoids in the coated film. These microvoids may be made by a variety of techniques including bubble nucleation, phase inversion, or through use of a textured carrier substrate. For these methods, a wet coating is applied to a moving carrier substrate, dried, and the dried porous film is subsequently peeled from the carrier substrate. Alternatively, a solid optical switch film may be formed on a carrier substrate by coating methods, and porosity may be achieved by a number of off-line treatments of the solid thin film after completion of the coating and drying process. These off-line treatments include drilling small pores, track etching methods, and polymer stretching. In terms of drilling small pores, laser drilling methods are suitable for preparing the porous optical switch film of the present invention. Track etching methods to form pores involve first irradiating a solid film with collimated light beams to break chemical bonds in the polymer and then rinsing away the degraded polymer.

The present invention also teaches a simple manufacturing method to prepare a composite optical switch film having both a light scattering layer and an electrically conductive layer. In this method, the final film may be either porous, as described above, or may be non-porous. In the method of the present invention, a thin electrically conductive layer may be applied simultaneously with the light scattering layer in a multilayer slide bead coating operation. In this way, the final film can be made to be substantially more electrically conductive. Composite films prepared by this method of the present invention have a plate resistivity of less than $10^{10}$ Ohms/sq. Thus, a composite optical switch film including an electrically conductive layer may be prepared in a simple one-step operation.

In the methods of the present invention, optical switch films are created by forming a single layer or, preferably, a multilayer composite on a slide surface of a coating hopper, the multilayer composite includes a bottom layer of low viscosity, one or more intermediate layers, and an optional top layer containing a surfactant. The multilayer composite flows down the slide surface and over a coating lip of the coating hopper and is applied to the moving substrate. In particular, the methods of the present invention are shown to allow for application of several liquid layers, each having a unique composition. Therefore, the present invention provides an advantageous method for the fabrication of multiple layer composite films that are required for certain optical elements or other similar elements.

Practical applications of the porous optical film according to the present invention include electronic switch devices, and more particularly, optical display devices using optical switching technology. In addition, the use of the porous optical film described in the present invention enables fabrication of thin flexible electronic displays. In practicing the present invention, it is preferred that the carrier substrate is a discontinuous sheet such as polyethylene terephthalate (PET). The PET carrier substrate may have a textured surface that acts as a template for the coated optical switch film.

Referring to FIG. 1, a schematic shows an optical switch device 300 that is known in prior art and suitable for use as a flat panel optical display. As shown in FIG. 1, a solid transparent moveable film 335 is situated between two rigid plates 311 and 312. Typically, the plates are a transparent material, such as glass, with one plate 312 acting as a guide for light emitted from source lamp 320. Plates 311 and 312 have thin electrically conductive layers 314 and 316, respectively. One suitable conductive material for electrically conductive layers 314 and 316 is indium tin oxide. Electrically conductive layers 314 and 316 are electrically isolated from the moveable optical switch film by an insulating layer 313, for example, silicon dioxide. The solid optical switch film 335 is positioned between plates 311 and 312 by means of spacers 318 to form a gap between plates 311 and 312 on the order of several microns. In addition, the optical switch film 335 also contains a thin transparent electrically conductive layer 315, such as indium tin oxide, as well as an internal light scattering means, such as dispersed titanium dioxide particles. During operation, the optical switch film 335 may be moved toward or away from the light guide plate 312 by varying the electrical potential between the light guide plate 312 and the optical switch film 335. As depicted in compartment 326 of FIG. 1, light 322 inside of light guide plate 312 is emitted when the optical switch film 335 contacts plate 312. On the other hand, light 324 remains inside the light guide plate 312 when optical switch film 335 does not contact light guide plate 312, as illustrated in compartment 328. For the case illustrated in compartment 328 of FIG. 1, no light is emitted. Moving optical switch film 335 to contact light guide plate 312, and, hence, away from light guide plate 312, bright and dark regions can be made with optical switching device 300. Adjusting the rate of contact between the optical switch film 335 and the light guide plate 312 creates gray scale. In general, switching speeds on the order of several milliseconds is desirable.

As described in WO 99/28890 issued to Van Gorkom, a low voltage potential difference of less than 50 volts is desirable to move the film between the two plates. To operate at such low potentials, Van Gorkom teaches the use of a vacuum of less than 10 Torr in compartments 326 and 328. Without vacuum, the potential difference required to move film 335 is objectionably high at 500 volts, at atmospheric pressure. To maintain a vacuum in the optical switch device 300, plates 311 and 312 must be impermeable to ambient gases (e.g. nitrogen, oxygen, and water). For this reason, glass is required at a thickness of about 1 mm. As a result, any display device formed by optical switching device 300 would be undesirably rigid, as well as heavy.

Figure 2:
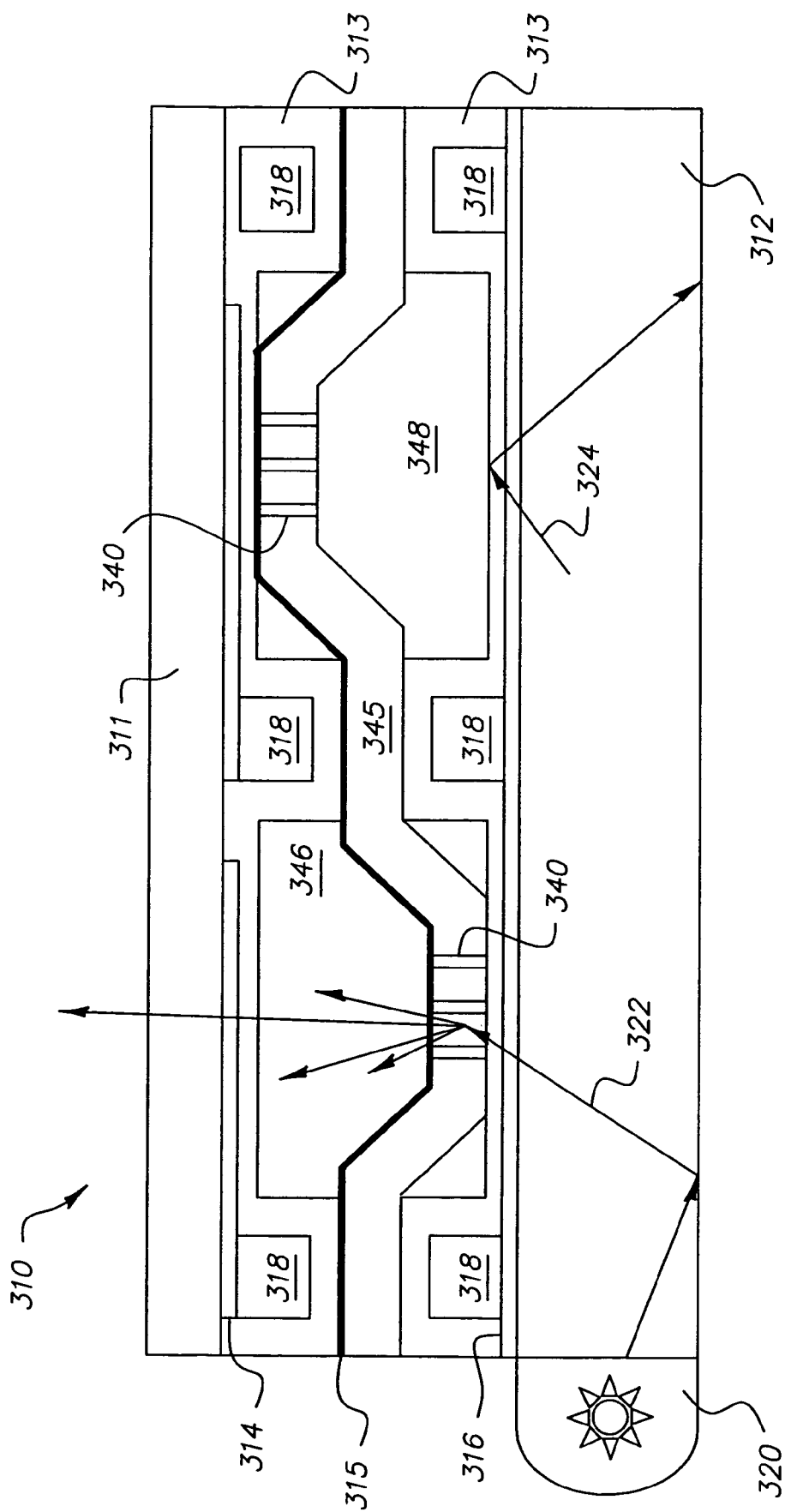
FIG. 2 is a schematic of an exemplary optical switch device using the porous optical switch film of the present invention.

Referring to FIG. 2, the inventors illustrate an exemplary porous optical switch film 345, according to the present invention, situated in a new optical switching device 310. For optical switching device 310, compartments 346 and 348 do not require a vacuum of less than 10 Torr to operate at low potentials, since the porous optical switch film 345 permits the movement of fluid through the porous optical switch film 345 during switching of the porous optical switch film 345 between plates 311 and 312. This movement of fluid through the porous optical switch 345 is illustrated more clearly in FIG. 3.

Figure 3:
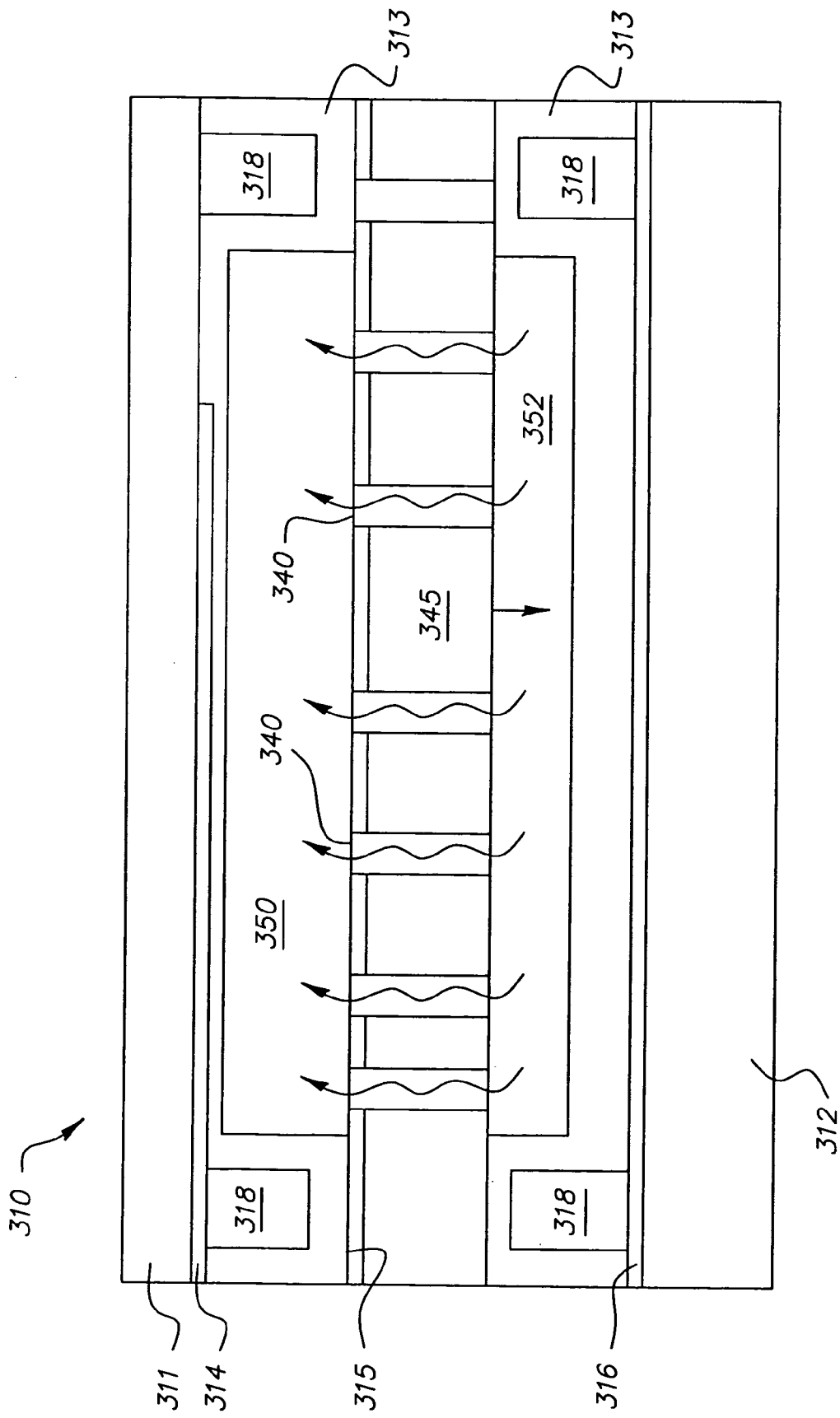
FIG. 3 is a schematic of an exemplary optical switch device using the porous optical switch film of the present invention.

As shown in FIG. 3, fluid from compartment 352 is allowed to pass freely through porous optical switch film 345 when the porous optical switch film 345 is in motion from the upper plate 311 to the light guide plate 312. As a result of the free motion of fluid through the porous optical switch film 345, the pressure difference between compartments 350 and 352 is greatly reduced during motion of the film. Therefore, evacuation of compartments 350 and 352 is unnecessary and operation of the optical switching device 310 at pressures well above 10 Torr is possible even at low switching potentials of less than 50 volts between the porous optical switch film 345 and the plates. Moreover, because the use of the porous optical switch film 345 of the present invention does not require a low vacuum to operate, flexible and lightweight plastic materials may be used as plates 311 and 312. Thus, the porous optical switch device 310, according to the present invention, allows the fabrication of a flexible, simpler, and more portable optical display.

Figure 4:
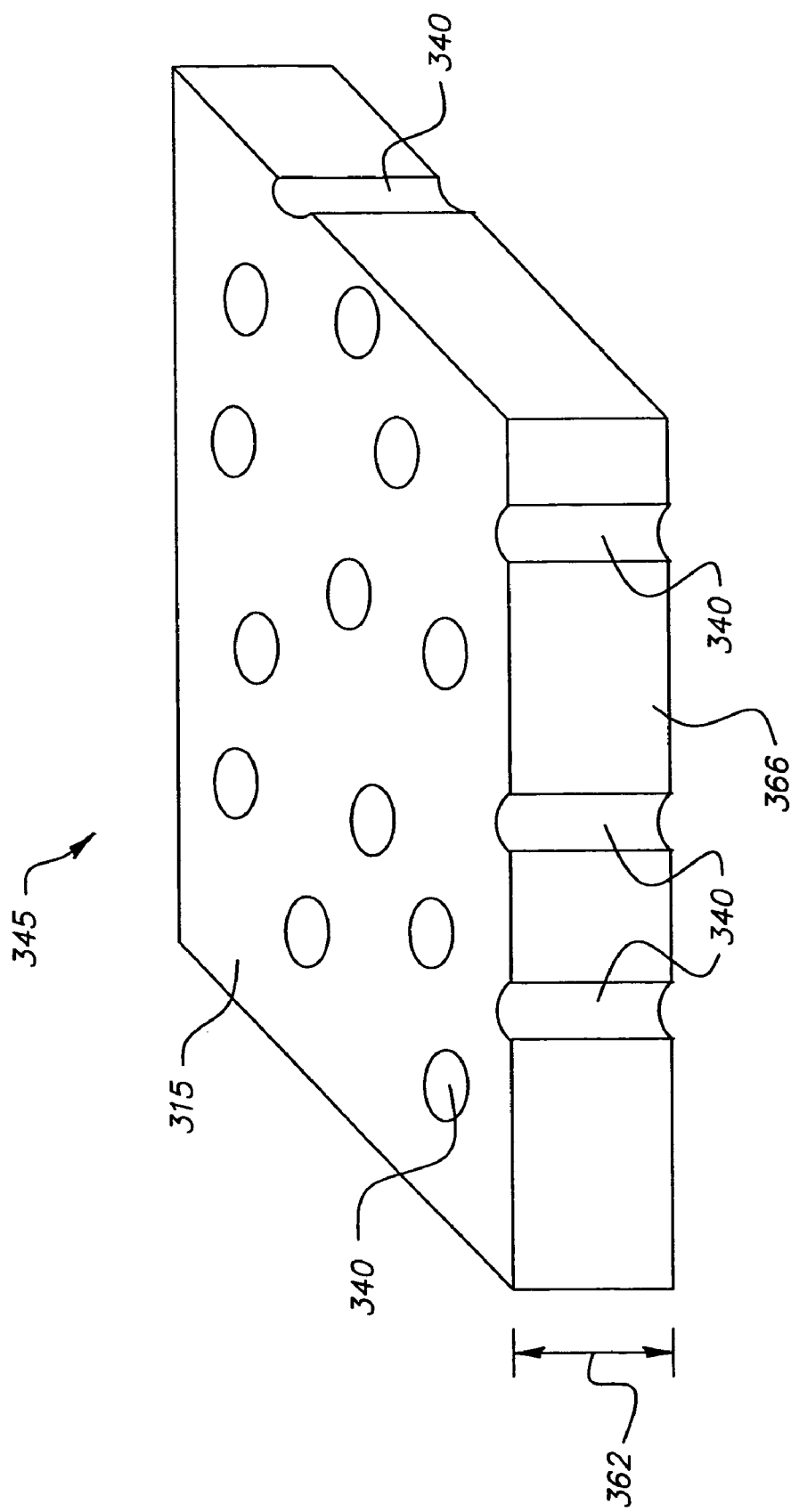
FIG. 4 is a schematic of an exemplary porous optical switch film of the present invention.

FIG. 4 illustrates the porous optical switch film 345 more closely. As depicted in FIG. 4, pores 340 span the thickness of the optical switch film 345 to permit the free movement of fluid molecules during actuation of the optical switch film 345 from one plate to the other. To achieve good flexibility, thickness 362 of the porous film 345 is typically thin, e.g. much less than 100 microns and preferably less than 10 microns. In one embodiment of the present invention, thickness 362 of the porous optical switch film 345 is in the range of 1.0 to 2.0 microns. In addition, the optical switch film 345 of the present invention may have a light scattering means 366 within the film. In one embodiment of the present invention, the light scattering means 366 are titanium dioxide particles (TiPure R-706™ is available from DuPont. with an average diameter of 0.36 microns). Rutile titanium dioxide has a refractive index of 2.7 and is an excellent light scattering pigment when dispersed into polymeric media having an index of refraction in the range of 1.3–1.7. In another embodiment, the light scattering means 366 are small air pockets or air voids deliberately formed in the polymeric optical switch film. Air has a refractive index of 1.0 and effectively scatters light in voided films of polymeric materials having a refractive index of 1.3–1.7. In one embodiment of the present invention, the polymer used to form the optical switch film 345 is both flexible and transparent, with a refractive index that is close to the refractive index of the plate material. Thus, the porous optical switch films of the present invention are light scattering or light diffusing films and have a light transmission of greater than 50%.

Figure 5:
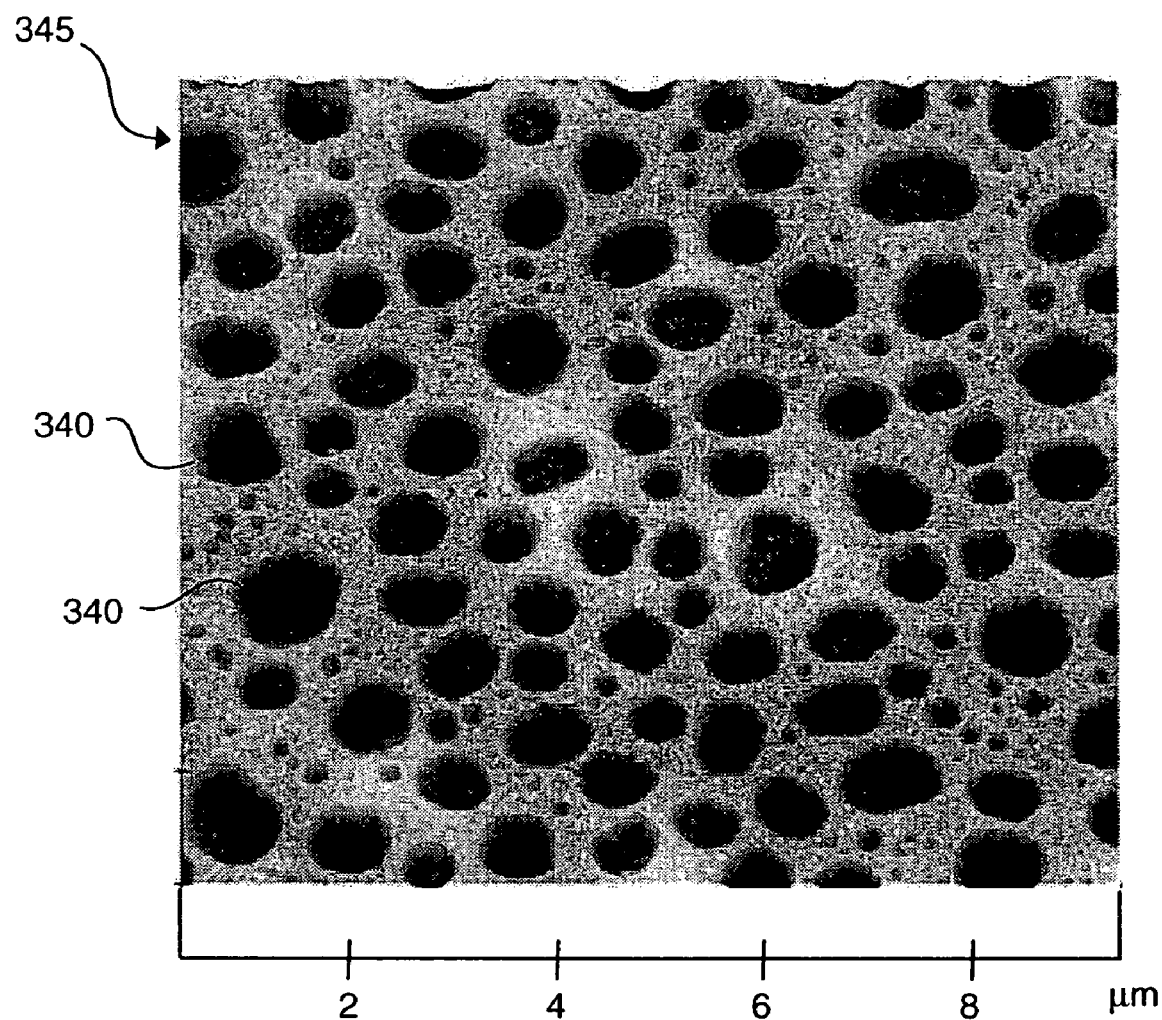
FIG. 5 is an atomic force micrograph of an exemplary porous optical switch film prepared by the method of the present invention using bubble nucleation.
Figure 6:
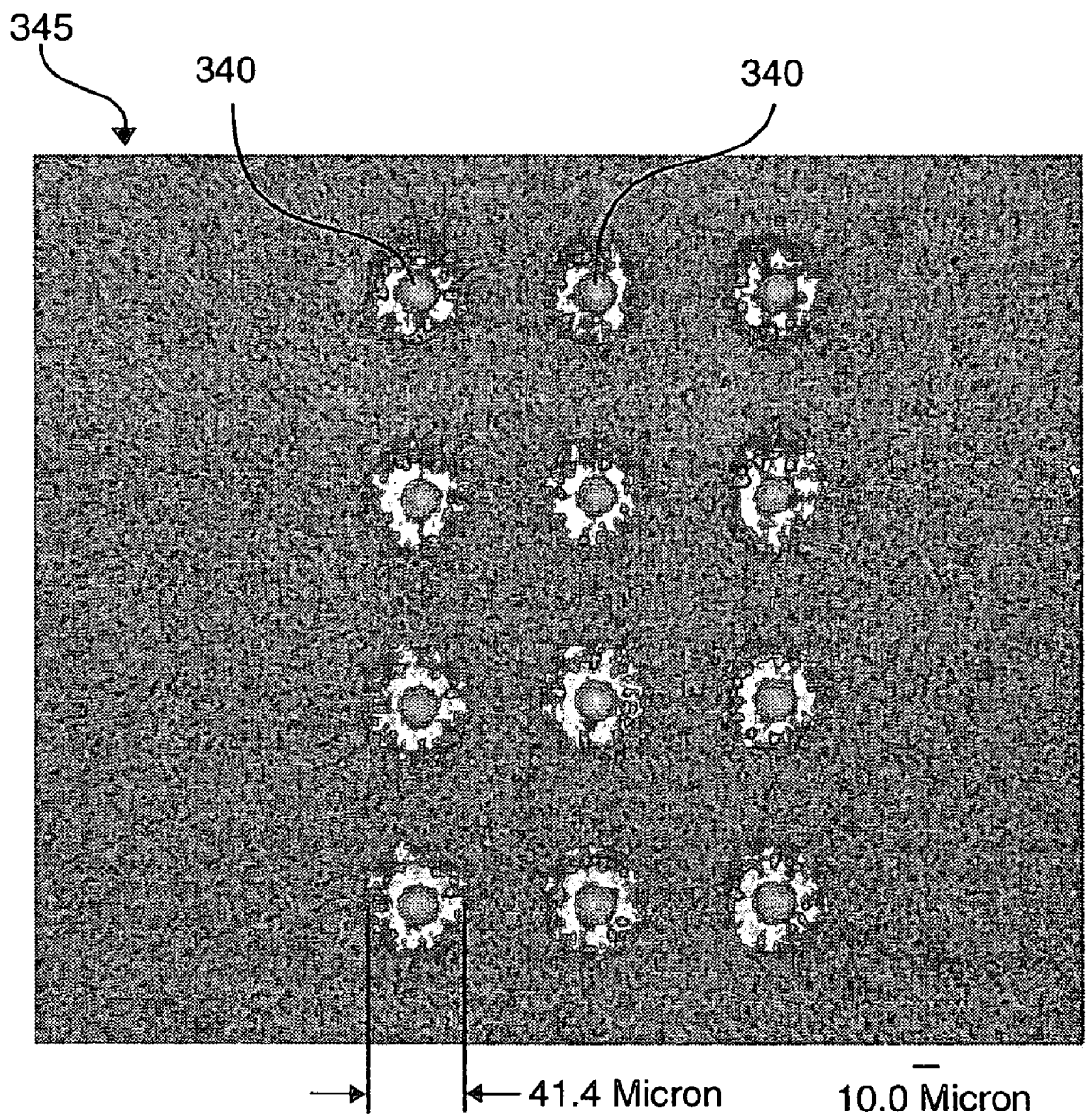
FIG. 6 is a light micrograph of an exemplary porous optical switch film prepared by the method of the present invention of the present invention using laser drilling.
Figure 7:
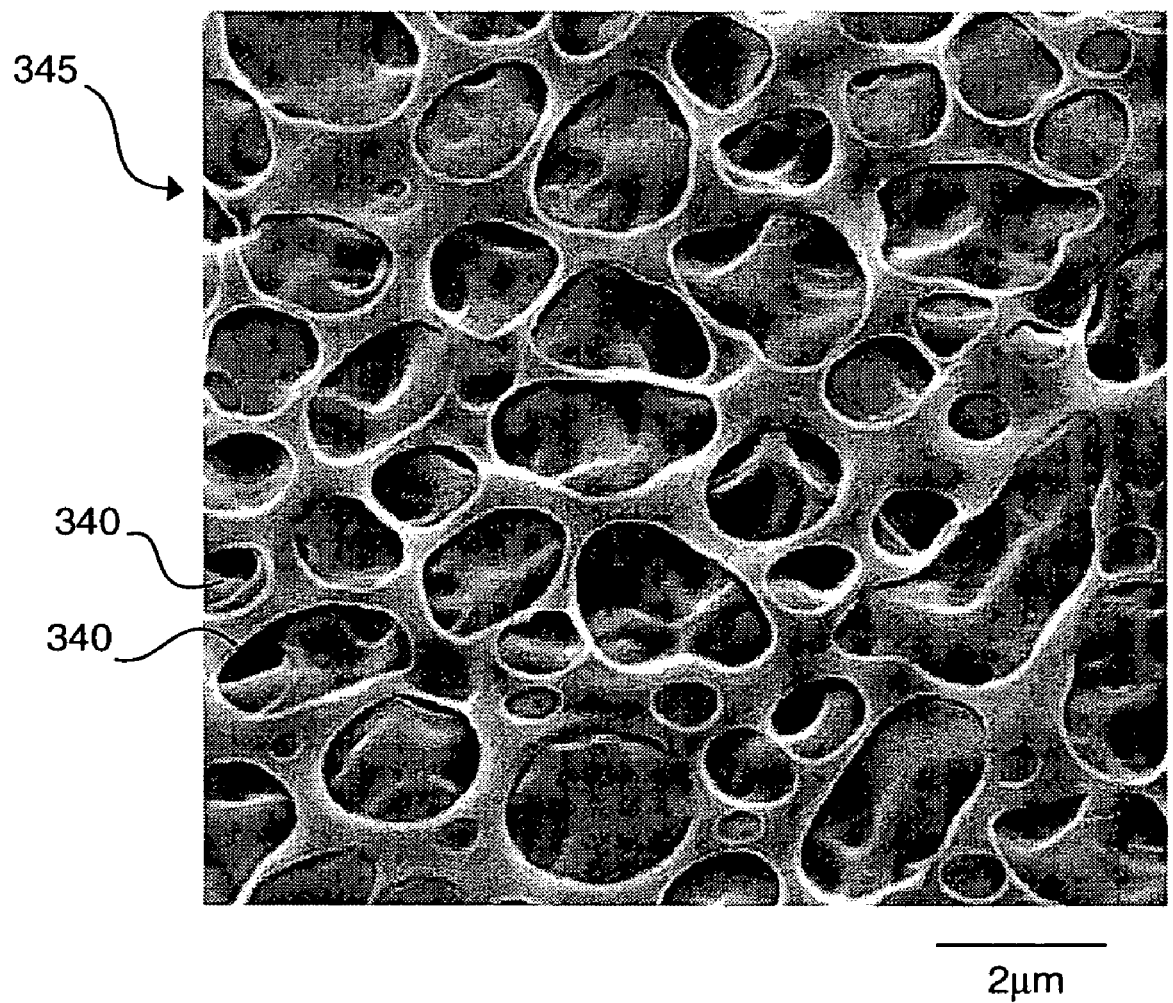
FIG. 7 is a scanning electron micrograph of an exemplary porous optical switch film prepared by the method of the present invention using phase inversion.

FIGS. 5–7 shows micrographs of various porous optical switch films 345 prepared by methods of the present invention as described below. In FIG. 5, a porous optical switch film 345 is shown with pores that have been formed using a bubble nucleation technique. While the complete mechanism for the formation of the pores shown in FIG. 5 is unclear, it is believed that bubbles are formed by rapidly heating the wet coated layer to induce bubble nucleation in the film 345. When dried and cooled, the bubbles collapse and form a random array of microvoids in a uniform thin film coating with a depth that spans the thickness of the film 345 (0.1–5.0 microns) and a width of 50–2000 nm. Modifying drying temperatures, using co-solvents, varying surfactant concentrations, and adjusting the overall thickness of the layer may control the depth and diameter of the microvoids. Applying a wet coating to a moving carrier substrate and then exposing the coated film to high temperatures volatilizes the coating solvent to form the structure shown in FIG. 5. After drying, the optical switch film 345 may be peeled from the carrier substrate. Pores 340 formed by this nucleation method are very small on the order of 1 micron in diameter or less. In addition, FIG. 5 shows that the pores 340 are randomly located in the film 345. Additionally, pores formed by the bubble nucleation method are randomly located pores. As described in Example 1 below, the sample shown in FIG. 5 is a 1.5 microns and is formed with cellulose triacetate as the polymer and contains 6 volume percent of titanium dioxide as a light scattering agent.

FIG. 6 shows a light micrograph of porous optical switch film 345 where pores 340 have been formed by laser drilling an initially solid film. The porous optical switch film 345 is formed from identical materials as described above, but without the high temperatures used to form the microvoids shown in FIG. 5. As a result, the optical switch film is solid, until pores 340 are created by the laser drilling method. As shown in FIG. 6, the pores 340 formed by laser drilling are substantially larger, at approximately 40 microns in diameter, compared to pores prepared by bubble nucleation and previously shown in FIG. 5. Laser drilling offers the ability to create uniform sized pores, as well as the ability to make a controlled pattern of pores, such as the simple square pattern shown in FIG. 6. Moreover, individual pore size may be adjusted, since laser drilling is currently capable of producing pores as small as 2 microns in diameter.

FIG. 7 shows a scanning electron micrograph of a porous optical switch film 345 prepared by phase inversion. For the phase inversion method, a wet coating containing polymer, solvent, and a low vapor pressure non-solvent is applied to a moving carrier substrate. During drying, the solvent evaporates leaving behind a coating rich in non-solvent that coagulates the polymer thereby forming the porous film structure having pores 340 as shown in FIG. 7. Additionally, pores formed by the phase inversion method are randomly located pores. After drying, the porous optical switch film 345 may be peeled from the carrier substrate. The peel force of the porous optical switch film 345 is less than 25 N/m. For the sample shown in FIG. 7, the polymer is cellulose triacetate, the solvent in 1,3-dioxolane, and the non-solvent is water.

An alternative method (described, not shown) for producing pores 340 in the optical switch film 345 is to apply a wet coating to a textured carrier substrate having protrusions that are at a greater height than the final dried film. In this way, pores 340 may be formed in the porous optical switch film 345 after peeling the film from the textured carrier substrate. The peel force of the porous optical switch film 345 is less than 25 N/m. The protrusions in the textured substrate may be formed by embossing the substrate prior to coating. Another method for producing protrusions on the carrier substrate (described, not shown) is to apply a textured subbing layer to the carrier substrate prior to coating the optical switch film. Suitable materials for the textured substrate include glass or polymeric beads (0.5–50 microns in diameter). For this method of generating a porous optical switch film 345, the protrusion beads would need to be well adhered to the carrier substrate by means of a suitable binder. Notably, equivalent methods of forming pores are anticipated and will suffice.

FIGS. 8–14 show schematics and example film structures that can be made with the disclosed coating and drying systems. The devices depicted in FIGS. 8–10 can be used to make both solid films and porous films. The description below shows how to make solid films using the coating and drying systems depicted in FIGS. 8–10. Notably, porous films can be made from solid films by laser drilling the solid films offline. Solid films may also be electrically conductive. One should note that porous films could be directly made, as well. In the text below, a general discussion describes operation of coating and drying systems depicted in FIGS. 8–10 to produce film structures that are depicted in FIGS. 11–14. Practical examples follow that disclose how to create each of the aforementioned.

Figure 8:
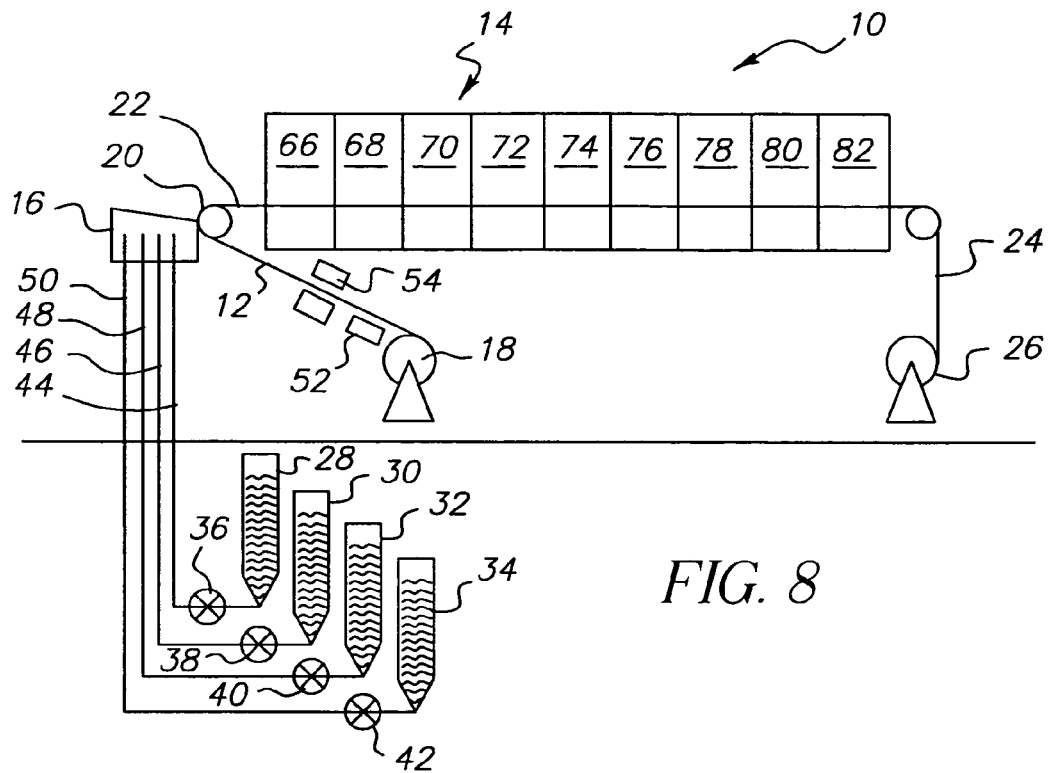
FIG. 8 is a schematic of an exemplary coating and drying apparatus that can be used in the practice of the methods of the present invention.

Turning now to FIG. 8 there is shown a schematic of an exemplary and well-known coating and drying system 10 suitable for preparing the optical switch films of the present invention. The coating and drying system 10 is typically used to apply very thin films to a moving substrate 12 and to subsequently remove solvent in a dryer 14. A single coating apparatus 16 is shown such that system 10 has only one coating application point and only one dryer 14, but two or three (even as many as six) additional coating application points with corresponding drying sections are known in the fabrication of composite thin films. The process of sequential application and drying is known in the art as a tandem coating operation.

Coating and drying apparatus 10 includes an unwinding station 18 to feed the moving substrate 12 around a back-up roller 20 where the coating is applied by coating apparatus 16. The coated web 22 then proceeds through the dryer 14.

In the practice of the method of the present invention, the final dry film 24, comprising a resin film on substrate 12, is wound into rolls at a wind-up station 26.

As depicted, an exemplary four-layer coating is applied to moving web 12. Coating liquid for each layer is held in a respective coating supply vessel 28, 30, 32, and 34. The coating liquid is delivered by pumps 36, 38, 40, 42, respectively, from the coating supply vessels to the coating apparatus 16 via conduits 44, 46, 48, 50, respectively. In addition, coating and drying system 10 may also include electrical discharge devices, such as corona or glow discharge device 52, or polar charge assist device 54, to modify the substrate 12 prior to application of the coating.

Figure 9:
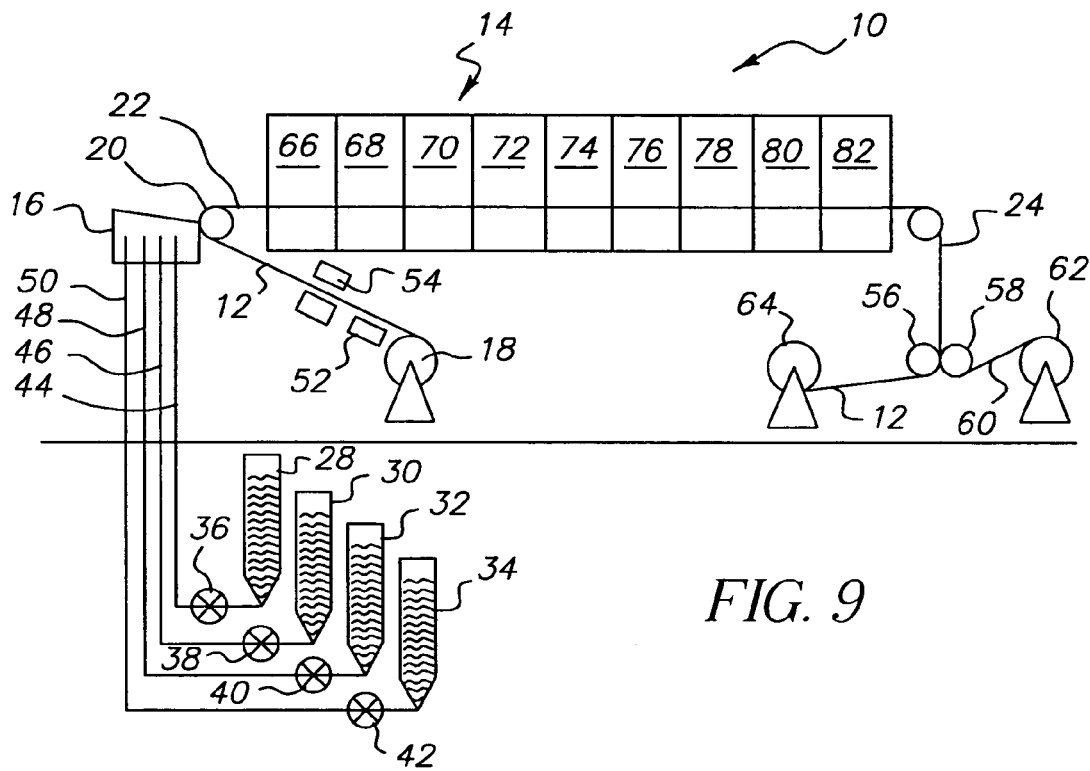
FIG. 9 is a schematic of an exemplary coating and drying apparatus of FIG. 8 including a station where the optical switch film separated from the substrate is separately wound.

Referring to FIG. 9, a schematic shows the same exemplary coating and drying system 10 depicted in FIG. 8 with an alternative winding operation. Accordingly, the drawings are numbered identically up to the winding operation. In the practice of the method of the present invention, the dry film 24, comprising a substrate, (which may be a resin film, paper, resin coated paper or metal), with a resin coating applied thereto is taken between opposing rollers 56, 58. The resin film 60 is peeled from substrate 12 with the optical film going to winding station 62 and the substrate 12 going to winding station 64. In a preferred embodiment of the present invention, polyethylene terephthalate (PET) is used as the substrate 12. The substrate 12 may be pretreated with a subbing layer to modify adhesion of the coated film 60 to the substrate 12.

The coating apparatus 16 used to deliver coating fluids to the moving substrate 12 may be a multilayer applicator such as a slide bead hopper, as taught for example in U.S. Pat. No. 2,761,791 issued Sep. 4, 1956 to Theodore A. Russell, titled "METHOD OF MULTIPLE COATING," or a slide curtain hopper, as taught by U.S. Pat. No. 3,508,947 issued Apr. 28, 1970 to Donald J. Hughes, titled "METHOD FOR SIMULTANEOUSLY APPLYING A PLURALITY OF COATED LAYERS BY FORMING A STABLE MULTILAYER FREE-FALLING VERTICAL CURTAIN." Alternatively, the coating apparatus 16 may be a single layer applicator, such as a slot die hopper or a jet hopper. In a single embodiment of the present invention, the coating apparatus 16 is a multilayer slide bead hopper.

As mentioned above, coating and drying system 10 includes a dryer 14 that will typically be a drying oven to remove solvent from the coated film. An exemplary dryer 14 used in the practice of the method of the present invention includes a first drying section 66 followed by eight additional drying sections 68–82 capable of independent control of temperature and air flow. Although dryer 14 is shown as having nine independent drying sections, drying ovens with fewer compartments are well known and may be used to practice the method of the present invention. In a single embodiment of the present invention, dryer 14 has at least two independent drying zones or sections.

Preferably, each of drying sections 66–82 each has independent temperature and airflow controls. In each section, temperature may be adjusted between 5 degrees Celsius and 150 degrees Celsius. To minimize drying defects from case hardening or skinning-over of the wet film, optimum drying rates are needed in the early sections of dryer 14. There are a number of artifacts created when temperatures in the early drying zones are inappropriate. The actual drying temperature in drying sections 66–82 may be optimized empirically within this range by those skilled in the art.

Figure 10:
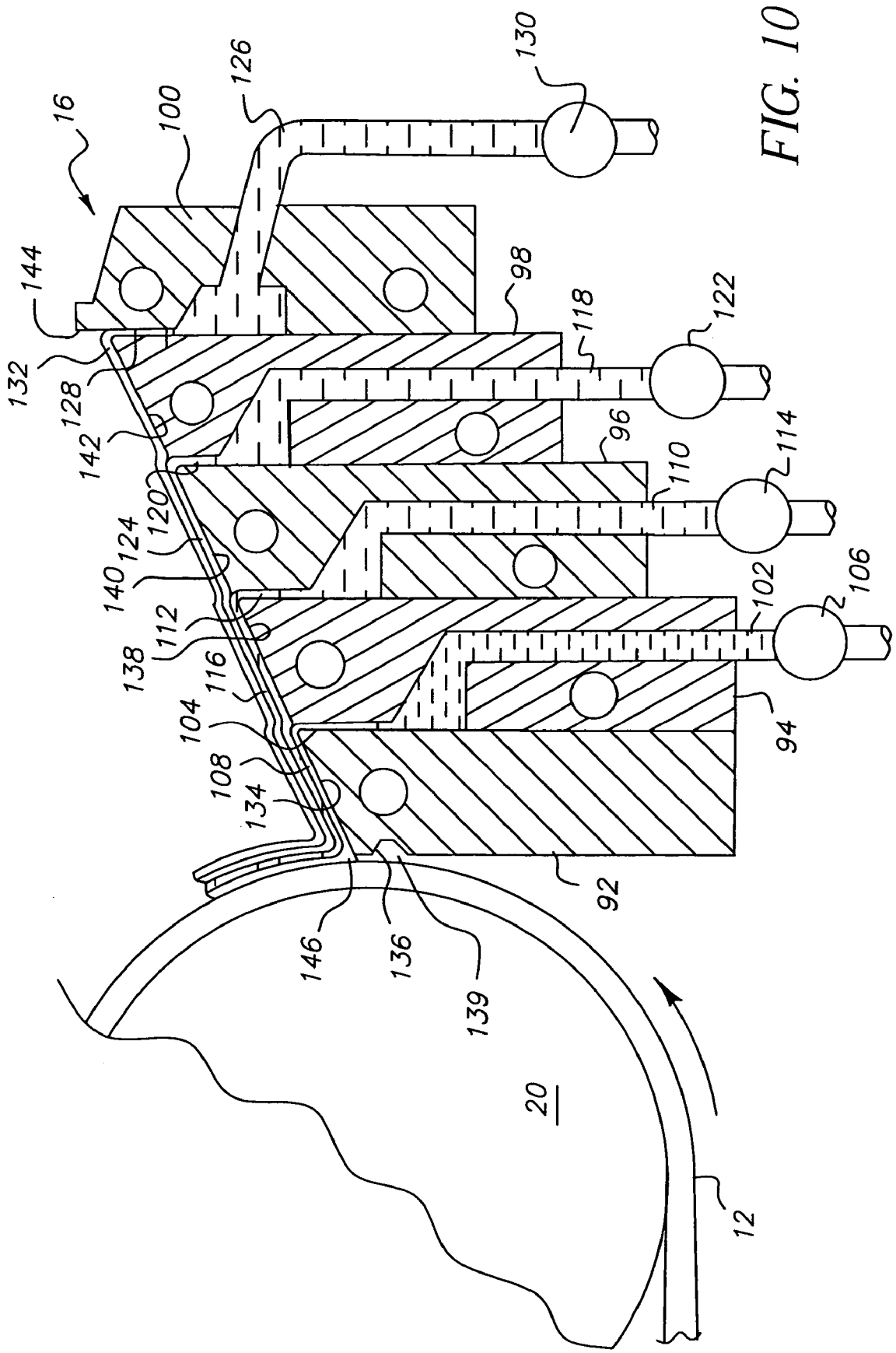
FIG. 10 is a schematic of an exemplary multi-slot coating apparatus that can be used in the practice of the method of the present invention.

Referring to FIG. 10, a schematic of an exemplary coating apparatus 16 is shown in detail. Coating apparatus 16, schematically shown in side elevational cross-section, includes a front section 92, a second section 94, a third section 96, a fourth section 98, and a back plate 100. There is an inlet 102 into second section 94 for supplying coating liquid to first metering slot 104 via pump 106 to thereby form a lowermost layer 108. There is an inlet 110 into third section 96 for supplying coating liquid to second metering slot 112 via pump 114 to form layer 116. There is an inlet 118 into fourth section 98 for supplying coating liquid to metering slot 120 via pump 122 to form layer 124. There is an inlet 126 into back plate 100 for supplying coating liquid to metering slot 128 via pump 130 to form layer 132. Each metering slot 104, 112, 120, 128 includes a transverse distribution cavity. Front section 92 includes an inclined slide surface 134, and a coating lip 136. There is a second inclined slide surface 138 at the top of second section 94. There is a third inclined slide surface 140 at the top of third section 96. There is a fourth inclined slide surface 142 at the top of fourth section 98. Back plate 100 extends above inclined slide surface 142 to form a back land surface 144. Residing adjacent the coating apparatus or hopper 16 is a coating backing roller 20. about which substrate 12 is conveyed. Coating layers 108, 116, 124, 132 form a multilayer composite which forms a coating bead 146 between lip 136 and substrate 12. Typically, the coating hopper 16 is movable from a noncoating position toward the coating backing roller 20 and into a coating position. Although coating apparatus 16 is shown as having four metering slots, coating dies having a larger number of metering slots (as many as nine or more) are well known and may be used to practice the method of the present invention.

Coating fluids are comprised principally of polymeric resins dissolved in a suitable solvent. Light scattering particulates may also be dispersed in the coating fluids. Suitable resins include any polymeric material that may be used to form a transparent film. Exemplary optical resins include cellulose triacetate, polyvinyl alcohol, polycarbonate, polyethersulfone, polymethylmethacrylate, and polyvinylbutyral. Other potential optical resins might include fluoropolymers (polyvinylidene fluoride, polyvinyl fluoride, and polycholorotrifluorethene), other cellulosics (cellulose diacetate, cellulose acetate butyrate, cellulose acetate propionate, and ethylcellulose), polyoefins (cyclic olefin polymers), polystyrene, aromatic polyesters (polyarylates and polyethylene terephthalate), sulfones (polysulfones, polyethersulfones, and polyarylsulfone), and polycarbonate co-polymers, among others. In the method of the present invention, there are no particular limitations as to the type of polymers or blends of polymers that may be used to form optical switch films. Polythiophenes are a suitable class of conductive polymer for the electrically conductive layer.

In terms of electrically conductive materials, the electrically conductive polymer used herein is a polythiophene derivative that is commercially from the Bayer Corporation as an aqueous solution (1.3% by weight) known as Baytron-P™. This polymer is based on polyethylene dioxythiophene (PEDOT) in the presence of styrenic sulfonic acid. Other conductive polymeric materials that may be used to form conductive layers include polyacetylene, polyphenylene, polypyrroles, and polyanilines.

In terms of solvents for aforementioned resin materials, suitable solvents include, for example, chlorinated solvents (methylene chloride and 1,2 dichloroethane), alcohols (methanol, ethanol, n-propanol, isopropanol, n-butanol, isobutanol, diacetone alcohol, phenol, and cyclohexanol), ketones (acetone, methylethyl ketone, methylisobutyl ketone, and cyclohexanone), esters (methyl acetate, ethyl acetate, n-propyl acetate, isopropyl acetate, isobutyl acetate, and n-butyl acetate), aromatics (toluene and xylenes) and ethers (tetrahydrofuran, 1,3-dioxolane, 1,2-dioxolane, 1,3-dioxane, 1,4-dioxane, and 1,5-dioxane). Water may also be used as a solvent. Coating solutions may also be prepared with a blend of the aforementioned solvents.

Coating fluids may also contain additives to act as converting aids. Converting aids include plasticizers and surfactants, and these additives are generally specific to the type of polymer film. For example, plasticizers suitable for polycarbonate, polyethersulfone, and cellulose triacetate films include phthalate esters (diethylphthalate, dibutylphthalate, dicyclohexylphthalate, dioctylphthalate, and butyl octylphthalate), adipate esters (dioctyl adipate), and phosphate esters (tricresyl phosphate and triphenyl phosphate). For the watersoluble polyvinyl alcohols, on the other hand, suitable plasticizers include polyhydric alcohols such as glycerin and ethylene glycol as well as amine alcohols such as ethanolamine.

Coating fluids may also contain surfactants as coating aids to control artifacts related to flow after coating. Artifacts created by flow after coating phenomena include mottle, repellencies, orange-peel (Bernard cells), and edge-withdraw. For polymeric resins dissolved in organic solvents, surfactants used to control flow after coating artifacts include siloxane and fluorochemical compounds. Examples of commercially available surfactants of the siloxane type include: 1.) Polydimethylsiloxanes such as DC200 Fluid™ from Dow Corning; 2.) Poly(dimethyl, methylphenyl)siloxanes such as DC510 Fluid™ from Dow Corning; 3.) Polyalkyl substituted polydimethysiloxanes such as DC190™ and DC1248™ from Dow Corning as well as the L7000 Silwet™ series (L7000, L7001, L7004 and L7230) from Union Carbide; and 4.) Polyalkyl substituted poly(dimethyl, methylphenyl)siloxanes such as SF1023™ from General Electric. Examples of commercially available fluorochemical surfactants include: 1.) Fluorinated alkyl esters such as the Fluorad™ series (FC430 and FC431) from the 3M Corporation; 2.) Fluorinated polyoxyethylene ethers such as the Zonyl™ series (FSN, FSN100, FSO, FSO100) from DuPont; 3.) Acrylate polyperfluoroalkyl ethylacrylates such as the F series™ (F270 and F600) from NOF Corporation; and 4.) Perfluoroalkyl derivatives such as the Surflon series™ (S383, S393, and S8405) from the Asahi Glass Company.

For polymeric resins dissolved in aqueous solvents, appropriate surfactants include those suitable for aqueous coating as described in numerous publications (see for example "Surfactants: Static And Dynamic Surface Tension" by Yves-M. Tricot in *Liquid Film Coating*, pages 99–136, Edited by Stephan F. Kistler and Peter M. Schweitzer, Chapman and Hall, 1997). Surfactants may include nonionic, anionic, cationic and amphoteric types. Examples of practical surfactants include polyoxyethylene ethers, such as polyoxyethylene (8) isooctylphenyl ether, polyoxyethylene (10) isooctylphenyl ether, and polyoxyethylene (40) isooctylphenyl ether, and fluorinated polyoxyethylene ethers such as the Zonyl series™ commercially available from DuPont.

Figure 11:
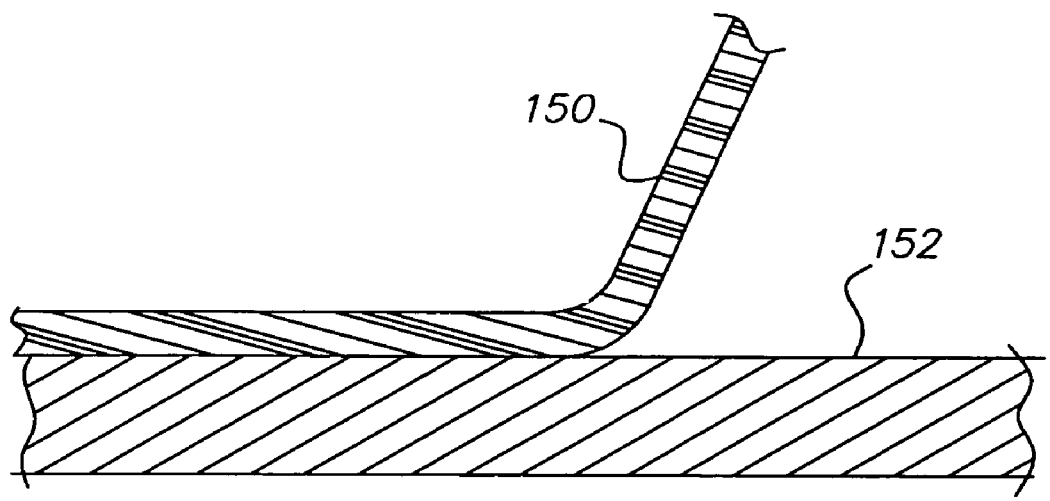
FIG. 11 shows a cross-sectional representation of a single-layer optical switch film partially peeled from a carrier substrate and formed by the method of the present invention.
Figure 12:
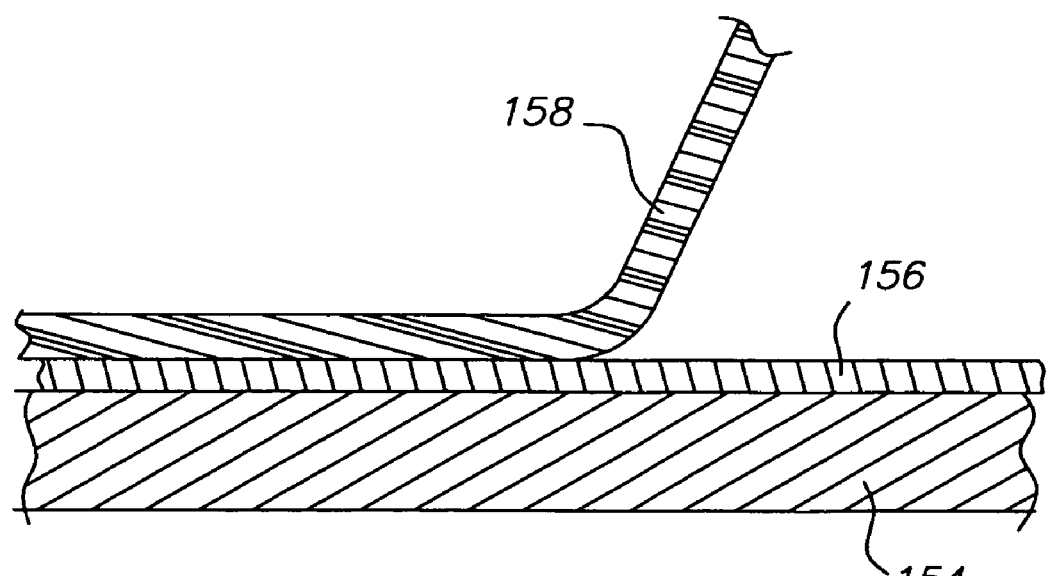
FIG. 12 shows a cross-sectional representation of a single-layer optical switch film partially peeled from a carrier substrate and formed by the method of the present invention wherein the carrier substrate has a subbing layer formed thereon.

Turning next to FIGS. 11 through 14, there are presented crosssectional illustrations showing various film configurations prepared by the methods of the present invention. In FIG. 11, a single-layer optical switch film 150 is shown partially peeled from a carrier substrate 152. Optical film 150 may be formed either by applying a single liquid layer to the carrier substrate 152 or by applying a multiple layer composite having a composition that is substantially the same among the layers. Alternatively in FIG. 12, the carrier substrate 154 may have been pretreated with a subbing layer 156 that modifies the adhesive force or texture between the single layer optical film 158 and the substrate 154.

Figure 13:
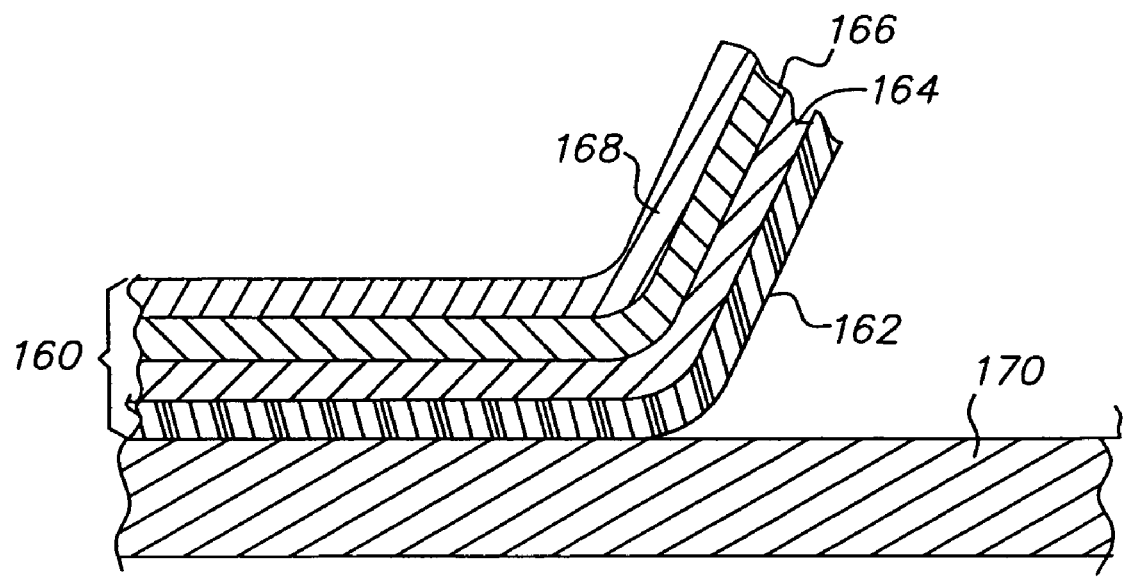
FIG. 13 shows a cross-sectional representation of a multi-layer optical switch film partially peeled from a carrier substrate and formed by the method of the present invention.

Referring to FIG. 13, a multiple layer film 160 is comprised of four compositionally discrete layers including a lowermost layer 162 nearest to the carrier support 170, two intermediate layers 164, 166, and an uppermost layer 168. In one embodiment of the present invention, the uppermost layer 168 contains an electrically conductive polymer such as polythiophene. Alternatively, the electrically conductive layer may be positioned in the intermediate layers 164 or 166. FIG. 13 also shows that the entire multiple layer composite 160 may be peeled from the carrier substrate 170.

Figure 14:
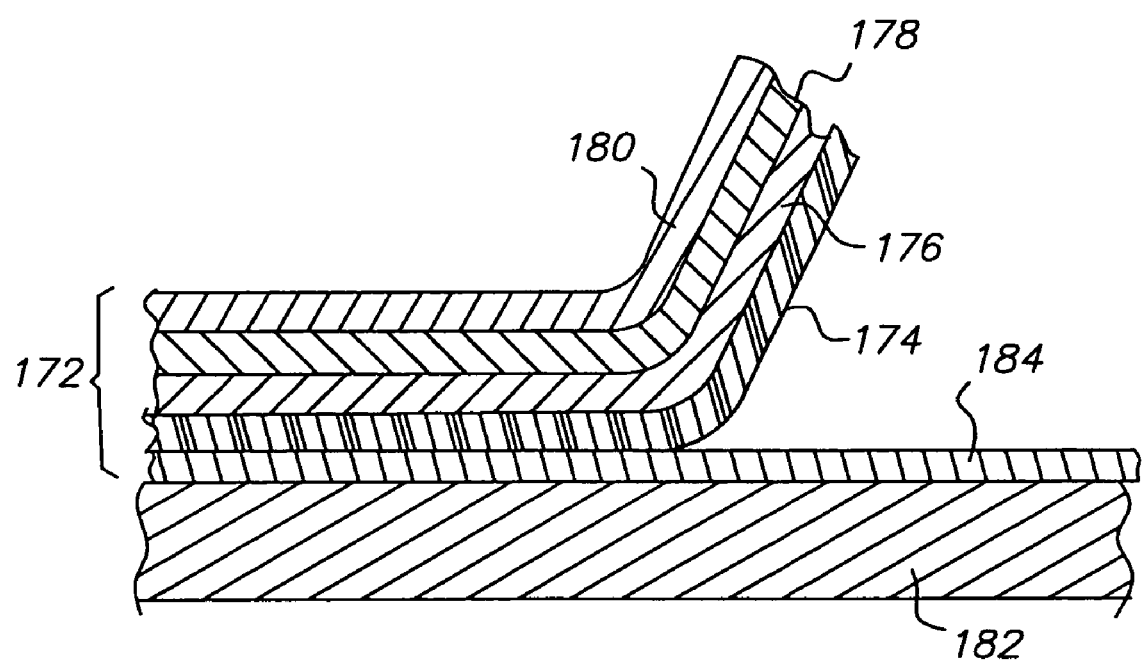
FIG. 14 shows a cross-sectional representation of a multi-layer optical switch film partially peeled from a carrier substrate and formed by the method of the present invention wherein the carrier substrate has a subbing layer formed thereon.

FIG. 14 shows a multiple layer composite film 172 comprising a lowermost layer 174 nearest to the carrier substrate 182, two intermediate layers 176, 178, and an uppermost layer 180 being peeled from the carrier substrate 182. The carrier substrate 182 has been treated with a subbing layer 184 to modify the adhesion between the composite film 172 and substrate 182. Subbing layer 156 (shown in FIG. 12) and subbing layer 184 (shown here in FIG. 14) may be comprised of a number of polymeric materials such as polyvinyacetals, polycarbonates, polyurethanes, cellulosics, acrylics, gelatin and poly(acrylonitrileco-vinylidene chloride-co-acrylic acid). The choice of materials used in the subbing layer may be optimized empirically by those skilled in the art.

The method of the present invention may also include the step of coating over a previously prepared composite of resin film and carrier substrate. For example, the coating and drying system 10 shown in FIGS. 8 and 9 may be used to apply a second multilayer film to an existing optical film/substrate composite. If the film/substrate composite is wound into rolls before applying the subsequent coating, the process is called a multi-pass coating operation. If coating and drying operations are carried out sequentially on a machine with multiple coating stations and drying ovens, then the process is called a tandem coating operation.

The practice of tandem coating or multi-pass coating requires some minimal level of adhesion between the firstpass film and the carrier substrate. In some cases, film/substrate composites having poor adhesion are observed to blister after application of a second or third wet coating in a multi-pass operation. To avoid blister defects, adhesion must be greater than 0.3 N/m between the firstpass resin film and the carrier substrate. This level of adhesion may be attained by a variety of web treatments including various subbing layers and various electronic discharge treatments. However, excessive adhesion between the applied film and substrate is undesirable since the film may be damaged during subsequent peeling operations. In particular, film/substrate composites having an adhesive force of greater than 250 N/m have been found to peel poorly. Films peeled from such excessively well-adhered composites exhibit defects due to tearing of the film and/or due to cohesive failure within the film. In one embodiment of the present invention, the adhesion between the optical switch film and the carrier substrate is less than 250 N/m. Most preferably, the adhesion between optical switch film and the carrier substrate is between 0.5 and 25 N/m.

The optical switch film is not separated from the carrier substrate until the coated film is substantially dry (<10% residual solvent by weight). In fact, the composite structure of resin film and carrier substrate may be wound into rolls and stored until needed. Thus, the carrier substrate cradles the optical switch film and protects against shearing forces during conveyance through the drying process. Moreover, because the resin film is dry and solid when it is finally peeled from the carrier substrate, there is no shear or orientation of polymer within the film due to the peeling process. As a result, films prepared by the current invention are remarkably amorphous and exhibit very low in-plane birefringence.

Wrinkling and cockle artifacts are minimized with the method of the present invention through the use of the carrier substrate. By providing a stiff backing for the resin film, the carrier substrate minimizes dimensional distortion of the optical film. This is particularly advantageous for handling and processing very thin films of less than about 40 microns. Moreover, scratches and abrasion artifacts that are known to be created by the casting method are avoided with the method of the present invention since the carrier substrate lies between the resin film and potentially abrasive conveyance rollers during all drying operations. Thus, the method of the present invention does not require the use of co-solvents, lubricants, or protective laminates as converting aids as are needed in conventional casting operations to minimize abrasion artifacts. In addition, the restraining nature of the carrier substrate also eliminates the tendency of resin films to distort or cockle over time as a result of changes in moisture levels. Thus, the method of the present invention insures that polymeric optical films are dimensionally stable during preparation and storage, as well as during final handling steps necessary for fabrication of optical elements.

Polymeric films can be made with the method of the present invention having a thickness of about 0.1 to 500 μm. Very thin resin films of less than 40 microns can be easily manufactured at line speeds not possible with prior art methods. The fabrication of very thin films is facilitated by a carrier substrate that supports the wet film through the drying process and eliminates the need to peel the film from a metal band or drum prior to a final drying step as required in the casting methods described in prior art. Rather, the film is substantially if not completely dried before separation from the carrier substrate. In all cases, dried resin films have a residual solvent content of less than 10% by weight. In a preferred embodiment of the present invention, the residual solvent content is less than 5%, and most preferably less than 1%. Thus, the present invention readily allows for preparation of very delicate thin films not possible with the prior art casting method.

The method of the present invention is suitable for application of resin coatings to a variety of substrates such as polyethylene terephthalate (PET), polyethylene naphthalate (PEN), polystyrene, cellulose triacetate, and other polymeric films. Polymeric substrates may be unstretched, unixially stretched, or biaxially stretched films or sheets. Additional substrates may include paper, laminates of paper and polymeric films, glass, cloth, and aluminum and other metal supports. In some cases, substrates may be pretreated with subbing layers or electrical discharge devices. Substrates may also be pretreated with functional layers containing various binders and addenda. There are no particular requirements regarding substrate thickness. For the optical resin films prepared here the substrate is PET with a thickness of either 100 or 175 μm. The method of the present invention may be practiced using substrates having a thickness of 5 to 500 μm.

The advantages of the present invention are demonstrated by the following practical examples given below. In these examples, the cellulose acetate polymer was the highly substituted type, cellulose triacetate (CTA) with approximately 58.0–62.5% acetic acid content, available from the Eastman Chemical Company as CA-436-80S™. The polyvinyl alcohol (PVA) was the fully hydrolyzed type with saponfication of greater than 98.5% available from the Shin-Etsu Chemical Company as C-20™. The titanium dioxide used is Ti-Pure R-706™ from DuPont.

EXAMPLE 1

This example describes the formation of a porous optical switch film by the bubble nucleation method. The coating apparatus 16 illustrated in FIG. 8 was used to apply four liquid layers to a moving substrate 12, 170 of untreated polyethylene terephthalate (PET) to form a multiple layer film as illustrated in FIG. 13. The substrate speed was 37.5 cm/s. All coating fluids were comprised of CTA dissolved in a blend of two solvents (a 95:5 ratio of 1,3-dioxolane:methanol where the ratio is by weight). The lowermost layer 162 had a viscosity of 5 cp. and a wet thickness of 10 μm on the moving substrate 12, 170. The second layer 164 had a viscosity of 220 cp. and had a wet thickness of 18 μm on the moving substrate 12, 170. The second layer 164 also contained dispersed titanium dioxide particles at a concentration of 35.8% by weight relative to the amount of CTA polymer. The third layer 166 had a viscosity of 340 cp. and a wet thickness of 10 μm on the moving substrate 12, 170. The uppermost layer 168 had a viscosity of 340 cp. and a wet thickness of 5 μm on the moving substrate 12, 170. The uppermost layer 168 also contained a silicone surfactant (DC 190) at a weight percent of 0.05%. Coatings were applied at a temperature of 24 degrees Celsius. Referring to FIG. 10, the gap 139 between the coating lip 136 and the moving substrate 12 was 200 μm. The pressure differential across the coating bead 146 was adjusted between 0–10 cm of water to establish a uniform coating. Referring to FIG. 8, the temperature in the drying section 66 was 25 degrees Celsius. The temperature in the drying sections 68 and 70 was 95 degrees Celsius. The temperature in the drying sections 72, 74, 76, 78, 80 was 95 degrees Celsius. The temperature in the drying section 82 was 25 degrees Celsius. The composite of porous optical switch film and PET substrate was wound into rolls. When peeled from the untreated PET substrate, the final dry film had a thickness of 1.5 μm. The peeled porous optical switch film had a uniformly white appearance and was free from wrinkles and cockle artifacts. The adhesive strength between the porous optical switch film and the PET carrier substrate was 1.1 N/m. FIG. 5 shows the porous structure of this sample as determined by atomic force microscopy. This porous optical switch film had a light transmission value of 76%. When coated with an electrically conductive layer such as indium tin oxide, this film is suitable for use in the optical switching device 310 illustrated in FIG. 2.

EXAMPLE 2

This example describes the formation of a porous optical switch film using the laser drilling method. The conditions were identical to those described in Example 1 except that the drying conditions were altered to produce a solid optical switch film that is subsequently made porous by an off-line laser drilling operation. Specifically, a solid optical switch film is formed by lowering the drying temperatures in drying sections 68 and 70 to 25 degrees Celsius. In addition, drying temperature in the drying sections 72, 74, 76, 78, 80 was reduced to 65 degrees Celsius. When peeled from the untreated PET substrate, the final dry film had a thickness of 1.3 μm. The peeled solid optical switch film had a uniformly white appearance and was free from wrinkles and cockle artifacts. This optical switch film appeared solid with no evidence of porosity after analysis with atomic force microscopy. Samples of this solid film were then drilled using pulsed ultraviolet laser processing techniques (an Excimerm laser system) while the optical switch film was still adhered to the PET carrier substrate. Pore sizes of 40 and 50 μm were laser drilled to produce a porous optical switch film. FIG. 6 shows the porous structure of the sample with approximately 40 μm pores as determined by light microscopy. When coated with an electrically conductive layer such as indium tin oxide, this film is suitable for use in the optical switching device 310 illustrated in FIG. 2.

EXAMPLE 3

This example describes the formation of a porous optical switch film by the phase inversion method. The conditions were identical to those described in Example 1, except that the all coating layers contained 5% weight of water in the formulation. In addition, the second layer contained no titanium dioxide particles. Finally, the drying temperature in drying sections 68 and 70 was reduced to 25 degrees Celsius to allow for a gradual increase in water concentration as the organic solvents evaporate from the wet coating. After drying, the porous optical switch film had a white appearance similar to that seen in the samples prepared with titanium dioxide as described in Examples 1 and 2 above. When peeled from the untreated PET substrate, the final dry film had a thickness of 1.6 μm. The peeled porous optical switch film was free from wrinkles and cockle artifacts. FIG. 7 shows the porous structure of this sample as determined by scanning electron microscopy. When coated with an electrically conductive layer such as indium tin oxide, this film is suitable for use in the optical switching device 310 illustrated in FIG. 2.

EXAMPLE 4

This example describes the formation of a solid optical switch film wherein an electrically conductive layer is simultaneously applied as an uppermost layer during formation of the optical switch film. The coating apparatus 16 illustrated in FIG. 8 was used to apply four liquid layers to untreated polyethylene terephthalate (PET) on the substrates 12 and 170 (as shown in FIGS. 8 and 13, respectively), as they move, to form a multilayer composite film (as illustrated earlier in FIG. 13). The substrate speed was 25 cm/s. All coating fluids were comprised of PVA dissolved water. The lowermost layer 162 had a viscosity of 6 cp. and a wet thickness of 10 μm on the moving substrate 170. The second 164 layer had a viscosity of 700 cp. and had a wet thickness of 19 μm on the moving substrate 170. The second 164 layer also contained dispersed titanium dioxide particles at a concentration of 29.4% by weight relative to the amount of PVA polymer. The third layer 166 had a viscosity of 309 cp. and a wet thickness of 5 μm on the moving substrate 170. The uppermost layer 168 had a viscosity of 80 cp. and a wet thickness of 15 μm on the moving substrate 170. The uppermost layer also contained an electrically conductive polymer, PEDOT, at a concentration of 0.8% of Baytron-P®. Coatings were applied at a temperature of 24 degrees Celsius. The gap 139 between the coating lip 136 and the moving substrate 12 (see FIG. 10) was 200 μm. The pressure differential across the coating bead 146 was adjusted between 0–10 cm of water to establish a uniform coating. The temperature in the drying sections 66, 68 and 70 was 25 degrees Celsius. The temperature in the drying sections 72, 74, 76, 78, 80 was 95 degrees Celsius. Referring to FIG. 8, the temperature in the drying section 82 was 25 degrees Celsius. The composite dry film 24 of conductive optical switch film and PET substrate was wound into rolls in wind up station 26. When peeled from the untreated PET substrate, the final dry film 160 had a thickness of 1.5 μm. The peeled electrically conductive optical switch film had a uniform appearance and was free from wrinkles and cockle artifacts. Referring to FIG. 13, the adhesive strength between the electrically conductive optical switch film 160 and the PET carrier substrate 170 was 0.7 N/m. This film had a plate resistivity of $9.2 \times 10^7$ Ohms/sq that is nearly ten thousand times lower than films prepared without the conductive polymer (see Comparative Example below).

EXAMPLE 5

This example describes the formation of a solid optical switch film wherein an electrically conductive layer is simultaneously applied as a middle layer during formation of the optical switch film. The conditions were identical to those described in Example 4, except that positioning of the third and uppermost layers was reversed. Specifically, here in Example 5 the third layer contained the conductive polymer. The uppermost layer was comprised of PVA and water only. In this way, a conductive optical switch film has been manufactured wherein the electrically conductive layer is protected inside the optical switch film. Referring to FIG. 8, the composite dry film 24 of conductive optical switch film and PET substrate was wound into rolls in the wind up station 26. Referring to FIG. 13, when peeled from the untreated PET substrate 170, the final dry film 160 had a thickness of 1.5 μm. The peeled electrically conductive optical switch film 160 had a uniform appearance and was free from wrinkles and cockle artifacts. This film had a plate resistivity of $5.0 \times 10^8$ Ohms/sq that is nearly ten thousand times lower than films prepared without the conductive polymer (see Comparative Example below).

COMPARATIVE EXAMPLE

This example describes the formation of a solid optical switch film with no electrically conductive layer. The conditions were identical to those described in Example 4, except that no conductive polymer was added to the uppermost layer. The uppermost layer was comprised of PVA and water only. The composite of solid optical switch film and PET substrate was wound into rolls. When peeled from the untreated PET substrate, the final dry film had a thickness of 1.5 μm. The peeled porous optical switch film had a uniform appearance and was free from wrinkles and cockle artifacts. This film was not conductive and had a plate resistivity of $2.8 \times 10^{12}$ Ohms/sq.

The following tests were used to determine film properties.

Thickness. Thickness of the final peeled film was measured in microns using a Model EG-225 gauge from the Ono Sokki Company.

Micrographs. Various techniques are used here to obtain micrographs to visualize film surfaces and structures. An Olympus light microscopic, Model BH-2, is used for low power light microscopy. For atomic force microscopy, a TappingMode™ Atomic Force Microscopy, Model D300 from Digital Instruments is used. Scanning electron microscopy is done with a Hitachi S-4100 field emission scanning electronic microscope after first coating samples with a thin layer of platinum-palladium. Cross-sections are prepared by freeze fracturing techniques using liquid nitrogen.

Resistivity. Plate resistivity or water electrode resistivity is determined by procedures described elsewhere by R. A. Elder, "Resistivity measurements on buried conductive layers," in EOS/ESD Symposium Proceedings, September 1990, pagers 251–254.

Light transmission and Haze. Total light transmission and haze are measured using the Haze-Gard Plus (Model HB-4725) from BYK-Gardner. Total light transmission is all the light energy transmitted through the film as absorbed on an integrating sphere. Transmitted haze is all light energy scattered beyond 2.5 degrees as absorbed on an integrating sphere.

Surface Roughness. Average surface roughness (Ra) was determined in nanometers (nm) by scanning probe microscopy using TappingMode™ Atomic Force Microscopy, Model D300 from Digital Instruments.

Adhesion. The adhesive strength of the coated samples was measured in Newtons per meter (N/m) using a modified 180 degree peel test with an Instron 1122 Tensile Tester with a 500 gram load cell. First, 0.0254 m (one inch) wide strips of the coated sample were prepared. Delamination of the coating at one end was initiated using a piece of 3M Magic Tape. An additional piece of tape was then attached to the delaminated part of the coating and served as the gripping point for testing. The extending tape was long enough to extend beyond the support such that the Instron grips did not interfere with the testing. The sample was then mounted into the Instron 1122 Tensile Tester with the substrate clamped in the upper grip and the coating/tape assembly clamped in the bottom grip. The average force (in units of Newtons) required to peel the coating off the substrate at a 180 degree angle at speed of 2 inches/min (50.8 mm/min) was recorded. Using this force value the adhesive strength in units of N/m was calculated using the equation:

$$S_A = F_P(1 - \cos\theta)/w$$

wherein $S_A$ is the adhesive strength, $F_P$ is the peel force, θ is the angle of peel (180 degrees), and w is the width of the sample (0.0254 m).

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST

10 drying system
12 moving substrate/web
14 dryer
16 coating apparatus
18 unwinding station
20 back-up roller
22 coated web
24 dry film
26 wind up station 28 coating supply vessel
30 coating supply vessel
32 coating supply vessel
34 coating supply vessel
36 pump
38 pump
40 pump
42 pump
44 conduit
46 conduit
48 conduit
50 conduit
52 discharge device
54 polar charge assist device
56 roller
58 roller
60 resin film
62 winding station
64 winding station
66 drying section
68 drying section
70 drying section
72 drying section
74 drying section
76 drying section
78 drying section
80 drying section
82 drying section
92 front section
94 second section
96 third section
98 fourth section
100 back plate
102 inlet
104 metering slot
106 pump
108 lowermost layer
110 inlet
112 metering slot
114 pump
116 layer
118 inlet
120 metering slot
122 pump
124 layer
126 inlet
128 metering slot
130 pump
132 layer
134 inclined slide surface
136 coating lip
138 inclined slide surface
139 gap
140 inclined slide surface
142 inclined slide surface
144 back land surface
146 coating bead
150 optical switch film
152 carrier substrate
154 carrier substrate
156 subbing layer
158 optical film
160 multiple layer film
162 lowermost layer
164 intermediate layer
166 intermediate layer
168 uppermost layer
170 carrier support
172 composite film
174 lowermost layer
176 intermediate layer
178 intermediate layer
180 uppermost layers
182 carrier substrate
184 subbing layer
300 prior art optical switch device
311 transparent plate
312 light guide plate
313 insulating layer
314 conductive layer
315 conductive layer
316 conductive layer
318 spacer
320 light source
322 transmitted light
324 reflected light
326 activated compartment
328 deactivated compartment
335 solid optical switch film
310 optical switch device
340 pores
345 porous optical switch film
346 activated compartment
348 deactivated compartment
350 compartment gap
352 compartment gap
362 film thickness
366 light scattering agent

What is claimed is:

1. A flexible optical switch film between at least two plates and having an electrical bias between the at least two plates, wherein the flexible optical switching film comprises: a light scattering agent integrated within a porous organic polymeric resin having pores that are formed throughout all of the porous organic polymeric resin, including a contact region between a transparent plate and a light guide plate where light is transmitted.

2. The optical switching film claimed in claim 1, wherein the porous film includes microvoids formed in the porous film, such that the microvoids are continuous airspaces from a surface of the porous film to an opposing surface of the porous film.

3. The optical switching film claimed in claim 1, wherein the optical switching film has minimal pressure differential in a region of space between the porous film and the at least two plates.

4. The optical switching film claimed in claim 1, wherein the optical switching film operates as a switch at less than 100 volts.

5. The optical switching film claimed in claim 1, wherein porosity of the porous film is controlled by forming microvoids according to phase inversion in the porous film.

6. The optical switching film claimed in claim 2, wherein forming the microvoids in the porous film is selected from the group consisting of phase inversion, bubble nucleation, track etching, stretched polymers, laser-drilling, and coating over a textured carrier substrate having protrusions thereupon the textured carrier substrate.

7. The optical switching film claimed in claim 1, wherein the porous film is near ambient pressure of 760 Torr.

8. An optical displace device, comprising:
a) a multi-layered flexible, composite film of organic polymeric resins having pores throughout all of the multi-layered flexible, composite film and whose multiple layers are formed simultaneously and coated simultaneously on a carrier substrate, in addition the multi-layered flexible, composite film includes a light scattering agent integrated within the composite film of organic polymeric resins and at least one electrically conductive layer; and b) at least two plates having the multi-layered flexible, composite film between the at least two plates such that the multi-layered flexible, composite film of organic polymeric resins is capable of contacting at least one f the two plates, thus forming an optical switch for the optical display device.

9. The optical device claimed in claim 8, wherein the multi-layered composite film is formed on a releasable carrer substrate.

10. The optical switching film claimed in claim 1, wherein light transmission via the porous film is greater than 50%.

11. The optical device claimed in claim 8, wherein light transmission of the multi-layered composite film is greater than 50%.

12. A method for fabricating an optical display device, comprising the steps of:

a) providing a carrier substrate;

b) coating, onto the carrier substrate, a releasable porous, flexible organic polymeric film having pores and a light scattering agent integrated throughout all of the releasable porous, flexible organic polymeric film;

c) coating an electrically conductive layer onto the releasable porous, flexible organic polymeric film at the same time as the releasable porous, flexible organic polymeric film is coated onto the carrier substrate; and d) assembling the releasable porous, flexible organic polymeric film between at least two electrically biased plates to enable contact with at least one of the electrically biased plates such that an optical switch is constructed for the optical device.

* * * * *

UNITED STATES PATENT AND TRADEMARK OFFICE
CERTIFICATE OF CORRECTION

| | |
|---|---|
| PATENT NO. | : 7,085,444 B2 |
| APPLICATION NO. | : 10/668421 |
| DATED | : August 1, 2006 |
| INVENTOR(S) | : Marcus S. Bermel et al. |

It is certified that error appears in the above-identified patent and that said Letters Patent is hereby corrected as shown below:

Column 20, claim 8, line 64    Please replace the word "displace" with the word --display--

Column 21, claim 8 (b)line 10    Please replace the letter "f" with the word --of--

Signed and Sealed this

Twelfth Day of December, 2006

JON W. DUDAS
*Director of the United States Patent and Trademark Office*